(12) United States Patent
Kim

(10) Patent No.: US 8,286,747 B2
(45) Date of Patent: Oct. 16, 2012

(54) DOUBLE SHIELD EXTERIOR AIRBAG DEVICE

(75) Inventor: Yong Sun Kim, Namyangju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/165,215

(22) Filed: Jun. 21, 2011

(65) Prior Publication Data

US 2012/0132475 A1   May 31, 2012

(30) Foreign Application Priority Data

Nov. 29, 2010   (KR) .................. 10-2010-0119624

(51) Int. Cl.
*B60K 28/10* (2006.01)

(52) U.S. Cl. .................. 180/274; 280/728.1; 280/728.2; 280/728.3; 280/743.1

(58) Field of Classification Search .................. 180/274; 280/728.1, 728.2, 728.3, 729, 742, 743.1, 280/738

See application file for complete search history.

(56) References Cited

U.S. PATENT DOCUMENTS

| 3,656,790 A * | 4/1972 | Truesdell .................. 293/107 |
| 3,708,194 A * | 1/1973 | Amit .................. 293/1 |
| 6,637,788 B1 * | 10/2003 | Zollner et al. .................. 293/107 |
| 7,036,844 B2 * | 5/2006 | Hammer et al. .................. 280/730.1 |
| 7,249,781 B2 * | 7/2007 | Kai et al. .................. 280/728.3 |
| 7,712,767 B2 * | 5/2010 | Takahashi et al. .................. 280/728.3 |
| 7,784,817 B2 * | 8/2010 | Choi et al. .................. 280/728.2 |
| 7,921,957 B2 * | 4/2011 | Satou et al. .................. 180/274 |
| 7,967,098 B2 * | 6/2011 | Choi .................. 180/274 |
| 8,006,997 B2 * | 8/2011 | Inoue et al. .................. 280/728.2 |
| 8,152,196 B2 * | 4/2012 | Choi et al. .................. 280/728.2 |

* cited by examiner

*Primary Examiner* — Toan To
(74) *Attorney, Agent, or Firm* — Morgan, Lewis & Bockius LLP

(57) ABSTRACT

A double shield exterior airbag device accommodated in an airbag housing mounted to a bumper of a vehicle, and deployed by gas supplied from an inflator may include an outer air cushion filled with the gas supplied from the inflator, and formed with a single cushion layer, an inner air cushion disposed in an internal space of the outer air cushion, and defining an inner chamber therein to receive the gas, and a plurality of partitioned chambers formed by a plurality of internal partitions that connect the outer air cushion with the inner air cushion, the partitioned chambers communicating with the inner chamber via a gas hole formed in the inner air cushion.

11 Claims, 7 Drawing Sheets

DOUBLE SHIELD EXTERIOR AIRBAG DEVICE

CROSS-REFERENCE TO RELATED APPLICATIONS

The present application claims priority to Korean Patent Application No. 10-2010-0119624 filed on Nov. 29, 2010, the entire contents of which is incorporated herein for purposes by this reference.

BACKGROUND OF THE INVENTION

1. Field of the Invention

The present invention relates generally to a double shield exterior airbag device with a one-way gas flow structure and, more particularly, to a double shield exterior airbag device which is capable of preventing the outflow of gas caused by the bursting of an overlapping portion in the event of a vehicle collision.

2. Description of Related Art

Generally, a vehicle which is driving on a road is provided with various kinds of safety devices so as to protect a driver and a passenger against an unexpected accident. A representative safety device is an airbag device that directly protects a driver and a passenger sitting in a front seat of the vehicle.

Such an airbag device is an interior airbag device which is inflated inside a vehicle in the event of an accident, thus protecting a passenger who is inside the vehicle. However, the airbag device is problematic in that a vehicle colliding with an external object, an oncoming vehicle, and a person who is outside the vehicle are never protected. It is particularly difficult to safely protect a passenger using only the interior airbag device of the vehicle.

Therefore, as shown in FIG. 6, an exterior airbag system has been developed to reduce the risk of injury to a passenger and damage to a vehicle. The exterior airbag system is constructed so that an exterior airbag A is mounted to a bumper B which is provided on the front of a vehicle, and a radar sensor LS or a camera sensor CS is provided at a position on the vehicle to detect the speed and distance of an external object before a collision, thus transmitting the detected result to a control unit U. That is, if the control unit U expects a collision before a vehicle collides with an external object such as another vehicle, it is determined whether the exterior airbag A is deployed or not. A deployment signal is generated based on the determined result so as to deploy the exterior airbag A, thus mitigating impact force in the event of a vehicle collision.

As shown in FIG. 7, the conventional exterior airbag device includes an airbag cushion 20 and an inflator 30. The airbag cushion 20 is accommodated in an airbag housing 10 which is mounted to a bumper of a vehicle in such a way as to be deployed forwards, and has partitioned chambers 23 which are partitioned by a plurality of internal partitions 25 and are simultaneously supplied with gas at the time of being deployed. The inflator 30 supplies gas to the partitioned chambers 23 so as to provide deploying force to the airbag cushion 20.

However, the conventional exterior airbag device is problematic in that the airbag cushion 20 is made by overlapping five or more pieces of nylon fabric so as to have pressure resistance and heat resistance, so that the multi-layered airbag cushion 20 may incur excessive material costs and manufacturing costs.

Further, the conventional exterior airbag device is problematic in that the partitioned chambers 23 are connected to a single space, so that gas present in the entire airbag cushion is lost if the airbag cushion is damaged by a sharp object during a collision after the airbag cushion has been deployed, and thus it is difficult to maintain base pressure resistance. As a result, the function of the airbag may be undesirably lost.

Furthermore, the conventional exterior airbag device is problematic in that an overlapping portion 26, which connects a cushion material to another cushion material when the airbag cushion 20 is manufactured, is overlapped once and then is sewn by a seam 27, so that the seam 27 of the overlapping portion may be torn in the event of a collision, thus causing the loss of gas present in the entire cushion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a double shield exterior airbag device, in which an airbag cushion filled with gas at the time of being deployed is formed in a single layer, thus reducing material costs and manufacturing costs, and the outflow of gas occurs only in a partitioned chamber corresponding to a damaged portion when the airbag cushion is damaged, and the remaining partitioned chambers may maintain a reliable airbag function, and an overlapping portion of cushion materials is sewn several times, thus preventing the outflow of gas due to the bursting of the overlapping portion in the event of a vehicle collision.

In an aspect of the present invention, the double shield exterior airbag device accommodated in an airbag housing mounted to a bumper of a vehicle, and deployed by gas supplied from an inflator, may include an outer air cushion filled with the gas supplied from the inflator, and formed with a single cushion layer, an inner air cushion disposed in an internal space of the outer air cushion, and defining an inner chamber therein to receive the gas, and a plurality of partitioned chambers formed by a plurality of internal partitions that connect the outer air cushion with the inner air cushion, the partitioned chambers communicating with the inner chamber via a gas hole formed in the inner air cushion.

The inner chamber may include the inflator therein.

An entrance of the outer air cushion and an entrance of the inner air cushion may be connected to the airbag housing mounted to the bumper of the vehicle in such a way as to be sealed.

The partitioned chambers may be partitioned from each other between the inner air cushion and the outer air cushion by the internal partitions to may have substantially the same internal volume.

The gas hole may be provided with an anti-backflow guide hose, the anti-backflow guide hose extending from the gas hole by a predetermined length into the partitioned chambers so as to prevent the gas from flowing backwards from the partitioned chambers into the inner chamber.

An overlapping portion at which pieces of fabrics for forming the outer air cushion and the inner air cushion may be connected to each other may be sewn twice by a first sewing part which may be sewn to connect portions from which overlapping of the fabrics may be initiated, and by a second sewing part which may be sewn to be connected to neighboring pieces of fabrics.

A size of the inner chamber may be set such that the inner chamber may be positioned in the internal space of the airbag housing when the airbag may be deployed, wherein the inner chamber may include on opposite lateral sides thereof subsidiary partitioned chambers which may be filled with the gas via the gas hole formed in the inner air cushion.

A size of the inner chamber may be set such that the inner chamber expands and protrudes to an outside of the airbag housing, when the airbag may be deployed, wherein the inner chamber may include on opposite lateral sides thereof subsidiary partitioned chambers which may be filled with the gas via the gas hole formed in the inner air cushion.

A size of the inner air cushion forming the partitioned chambers may be equal to or smaller than the size of the outer air cushion forming the partitioned chambers.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
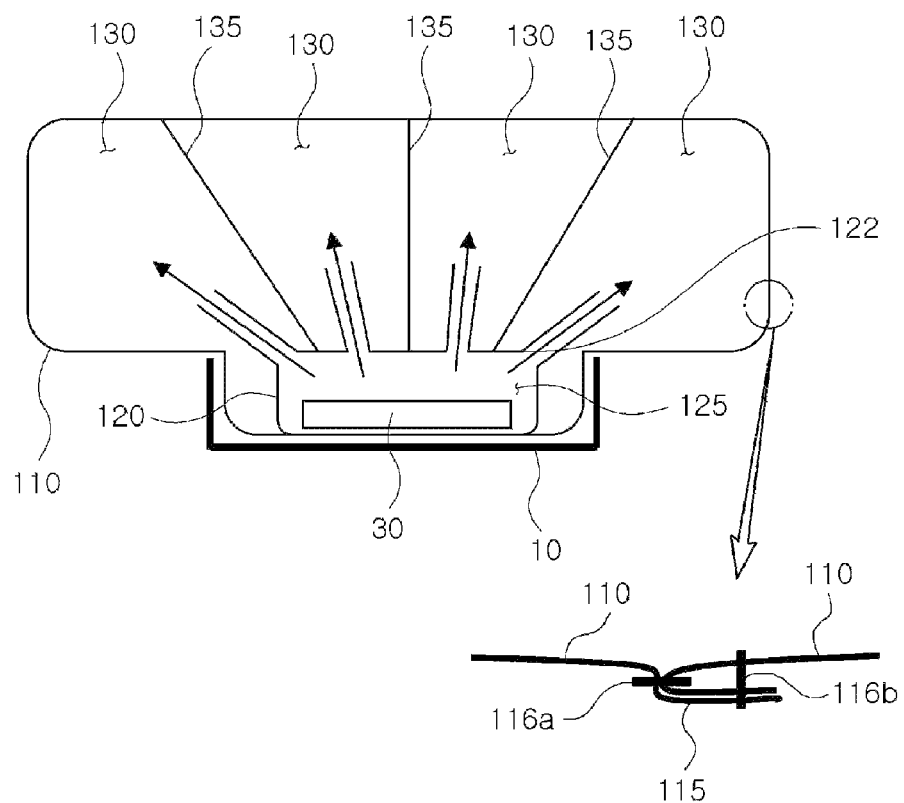
FIG. 1 is a view showing the construction of a double shield exterior airbag device according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
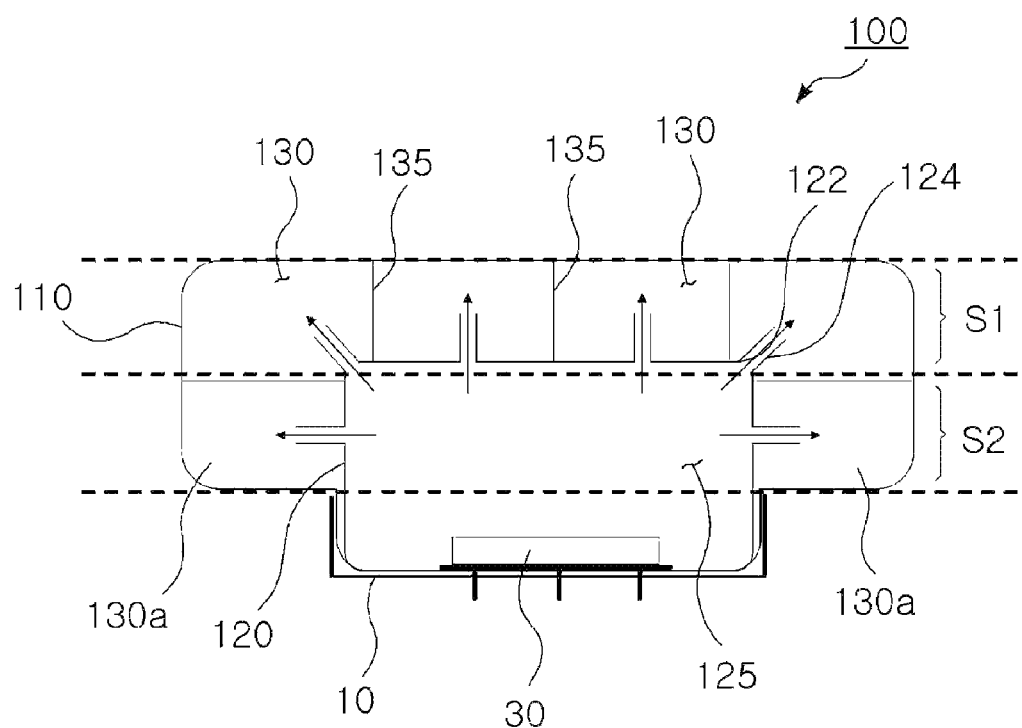
FIG. 2 is a view showing the construction of a double shield exterior airbag device according to various exemplary embodiments of the present invention.

As shown in FIGS. 1 and 2, a double shield exterior airbag device 100 according to an exemplary embodiment of the present invention includes an outer air cushion 110, an inner air cushion 120, and partitioned chambers 130, thus dividing an internal space into two spaces in a direction where airbag gas is supplied, and dividing an outer space of the two spaces into multiple spaces.

The outer air cushion 110 is an air cushion that is filled with gas supplied by an inflator 30 and is formed in a single cushion layer. The inflator 20 is provided in an airbag housing 10 which is mounted to a bumper of a vehicle.

The inner air cushion 120 is disposed in an internal space of the outer air cushion 110. Thus, the inner air cushion 120 is an air cushion that has an inner chamber 125 of a predetermined size to accommodate the inflator 30 for supplying the airbag gas.

An entrance of the outer air cushion 110 and an entrance of the inner air cushion 120 are connected to the airbag housing 10 mounted to the bumper, in such a way as to be sealed.

In order to form the plurality of partitioned chambers 130, a junction between the outer air cushion 110 and the inner air cushion 120 is partitioned into a plurality of portions by a plurality of internal partitions 135, each of which is connected at opposite ends to the outer air cushion 110 and the inner air cushion 120.

The plurality of partitioned chambers 130 communicate, via at least one gas hole 122 formed through the inner air cushion 120, with the inner chamber 125 in which the inflator 30 is disposed. Thus, the airbag gas supplied from the inflator 30 during the deployment primarily fills the inner chamber 125, and thereafter fills the respective partitioned chambers 130 via the gas hole 122.

Preferably, the partitioned chambers 130 are partitioned from each other to have the same internal volume by the internal partitions 135. Such a construction allows the partitioned chambers 130 to be simultaneously expanded by the airbag gas supplied through the gas hole 122 when the airbag is deployed.

Further, the gas hole 122 is preferably provided with an anti-backflow guide hose 124 which extends from the gas hole 122 by a predetermined length to form a one-way gas flow from the inner chamber 125 to the partitioned chambers 130 when the airbag is deployed and to prevent the back flow of the airbag gas from the partitioned chambers 130 to the inner chamber 125.

Such an anti-backflow guide hose 124 is made of the same fabric material as the inner air cushion 120. The anti-backflow guide hose 124 extends towards the partitioned chambers 130 by the one-way gas flow which is shown by the arrows of the drawing during the supply of the airbag gas, and thereafter is folded by gravity when the supply of the airbag gas stops, thus naturally preventing the airbag gas from being supplied in a reverse direction.

Here, each of the outer air cushion 110, the inner air cushion 120 and the internal partitions 135 is made of Aramid fiber (Kevlar®) which was developed by Dupont Inc. to have a pressure resistance of 814 kpa and a heat resistance of 540° C.

Further, the outer air cushion 110 and the inner air cushion 120 are connected to each other by sewing many pieces of fabric together so as to provide a predetermined size. An overlapping portion 115 at which the pieces of fabric overlap with each other is sewn twice by a first sewing part 116a sewn to connect portions from which the overlapping of the fabric is initiated, and a second sewing part 116b sewn to be connected to a neighboring piece of fabric, thus preventing a connected portion of fabric for the airbag cushion from being burst by external shocks in the event of a vehicle collision, therefore preventing a defective product from being produced and enhancing the reliability of a product.

Meanwhile, as shown in FIG. 1, the size of the inner chamber 125 may be set such that the inner chamber 125 is in the internal space of the airbag housing 10 when the airbag is deployed. Further, as shown in FIG. 2, the size of the inner chamber 125 may be set such that the inner chamber 125 expands and protrudes to the outside of the airbag housing 10 when the airbag is deployed.

In the case where the size of the inner chamber 125 is set such that the inner chamber 125 expands and protrudes to the outside of the airbag housing 10 when the airbag is deployed, subsidiary partitioned chambers 130a are provided on opposite sides of the inner chamber 125. Each subsidiary partitioned chamber 130a is adjacent to the partitioned chamber 130 along the outer edge of the outer air cushion 110, and is supplied with airbag gas through the gas hole 122 which is formed in the inner air cushion 120.

Further, when the subsidiary partitioned chambers 130a are provided on the opposite sides of the inner chamber 125, a first shield part S1 and a second shield part S2 are formed. The first shield part S1 is formed by the plurality of partitioned chambers 130 so as to primarily absorb shocks in the event of a vehicle collision. The second shield part S2 is formed by the subsidiary partitioned chambers 130a and the inner chamber 125 so as to secondarily absorb shocks even if the partitioned chambers 130 are damaged. A two-step shock absorbing structure using the first and second shield parts S1 and S2 protects a vehicle and absorbs the shocks to the vehicle.

The outer air cushion 110 and the inner air cushion 120 constructed as described above are deployed just before a collision by a radar sensor and a camera sensor and a control unit that determines the deployment in response to the detected signal.

That is, the radar sensor and the camera sensor detect the speed and distance of a vehicle and an external object, and then apply the detected signal to the control unit. Here, the radar sensor detects the speed and distance of the external object before a collision and then transmits the detected signal to the control unit, while the camera sensor captures the image of the external object. Moreover, a vehicle speed sensor which may detect the speed and distance of the vehicle, a steering angle sensor, a wheel speed sensor, a G sensor, etc. may be provided.

Subsequently, if the signal detected by each sensor has been transmitted to the control unit, the control unit determines whether the vehicle will collide with the external object based on the detected signal. If a vehicle collision is expected, the deployment signal is applied to the inflator 30, thus making the airbag cushion, having the partitioned chambers 130 between the outer air cushion 110 and the inner air cushion 120, be deployed in front of the vehicle. At this time, if the relative speed between the vehicle and the external object is a predetermined speed or more, and the distance between the vehicle and the external object is a predetermined distance or less, the control unit determines that a collision will soon occur between the vehicle and the external object, and applies the deployment signal to the inflator 30.

When the deployment signal is applied, the control unit performs a control operation to simultaneously supply airbag gas to the inner chamber 125 formed in the inner air cushion 120 and to the partitioned chambers 130 formed between the outer air cushion 110 and the inner air cushion 120, or performs a control operation to provide a time gap at the time of setting TTF (time to fire), thus allowing the partitioned chambers 130 and the inner chamber 125 to be deployed sequentially.

Thus, if the airbag gas is supplied by the operation of the inflator 30 which is provided in the inner air cushion 120, the airbag gas is supplied from the inner chamber 125, through the gas hole 122 corresponding to each partitioned chamber 130 and the anti-backflow guide hose 124, into each partitioned chamber 130 in one direction, thus providing a predetermined shape to the cushion.

Next, even if one of the partitioned chambers 130 is damaged by the collision with the external object and thus the airbag gas flows out, non-damaged chambers maintain the inflating state, thus reliably performing a shock absorbing function.

Figure 3:
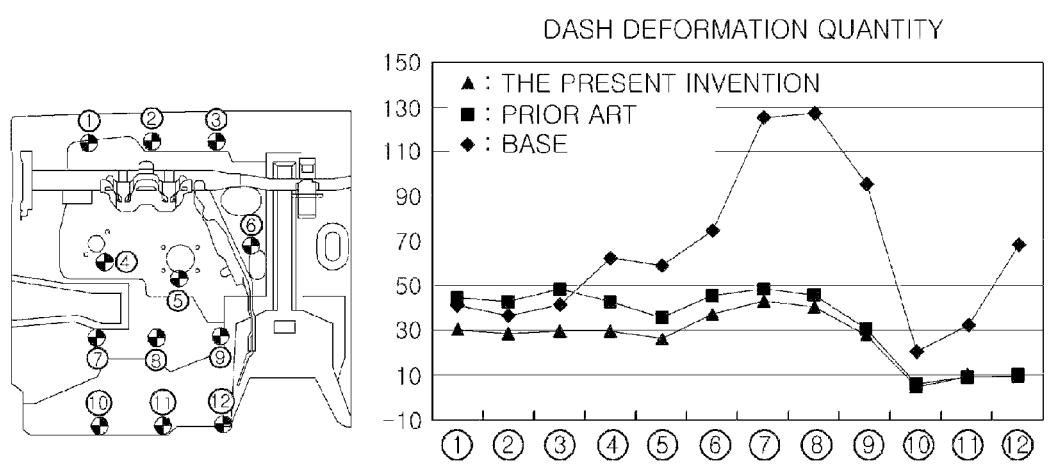
FIG. 3 is a graph showing a dash deformation quantity for each portion in the event of a head-on collision of a vehicle equipped with a double shield exterior airbag device according to a preferred embodiment of the present invention.

FIG. 3 is a graph showing a dash deformation quantity for each portion in the event of a head-on collision of a vehicle equipped with a double shield exterior airbag device according to an exemplary embodiment of the present invention. The graph is obtained by measuring a deformation quantity using the sensor installed in a main part of the vehicle, when the head-on collision between the vehicle and the external object occurs at a speed of 56 km/h. Referring to the graph, it can be seen that the deformation quantity of the present invention is much lower than that of the prior art.

Figure 4:
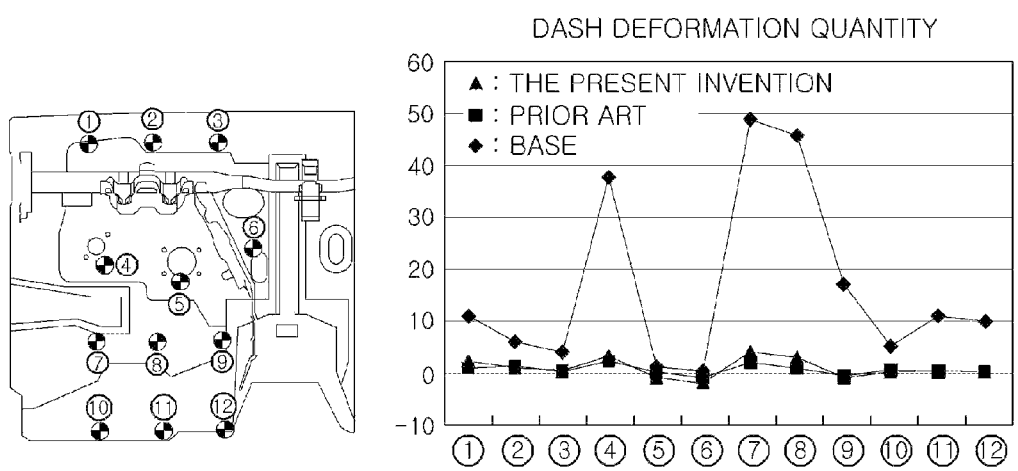
FIG. 4 is a graph showing a dash deformation quantity for each portion in the event of an angular collision of the vehicle equipped with the double shield exterior airbag device according to the preferred embodiment of the present invention.

FIG. 4 is a graph showing a dash deformation quantity for each portion in the event of an angular collision of the vehicle equipped with the double shield exterior airbag device according to the exemplary embodiment of the present invention. The graph is obtained by measuring a deformation quantity using the sensor installed in the main part of the vehicle, when the angular collision between the vehicle and the external object occurs at a speed of 48 km/h. Referring to the graph, it can be seen that the deformation quantity of the present invention is similar to that of the prior art.

Figure 5:
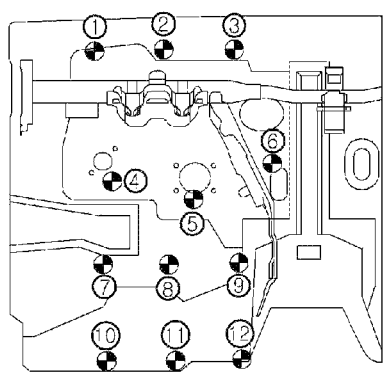
FIG. 5 is a graph showing a dash deformation quantity for each portion in the event of a center pole collision of the vehicle equipped with the double shield exterior airbag device according to the preferred embodiment of the present invention.
Figure 5:
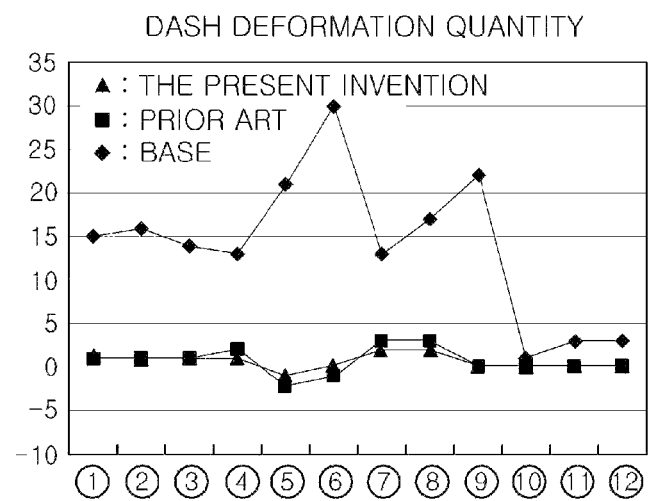
Figure 6:
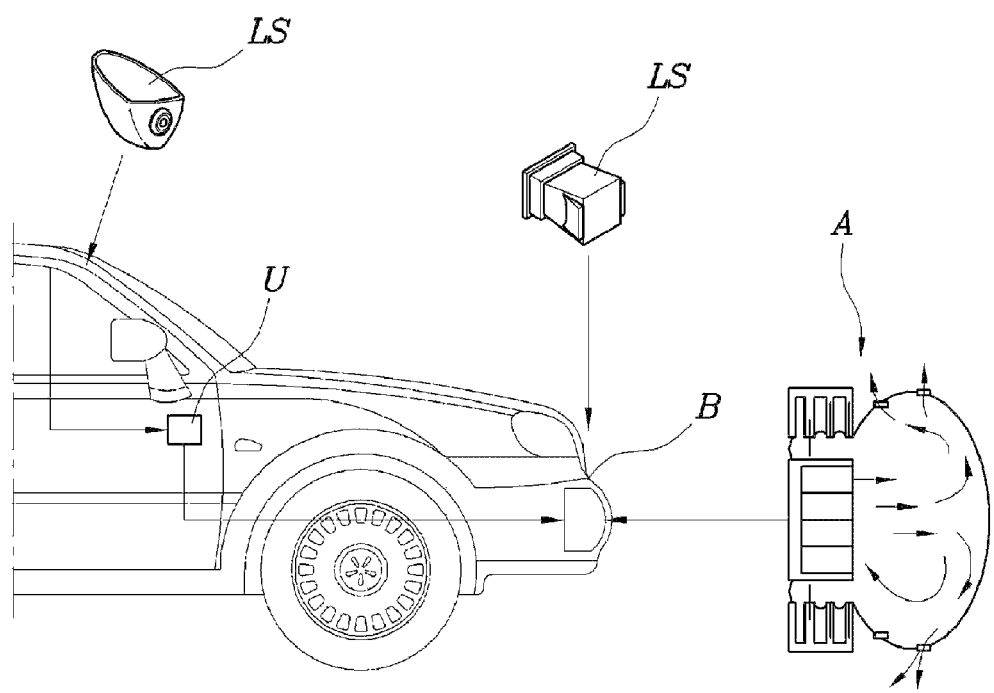
FIG. 6 is a schematic view showing the construction of a conventional exterior airbag device for a vehicle.
Figure 7:
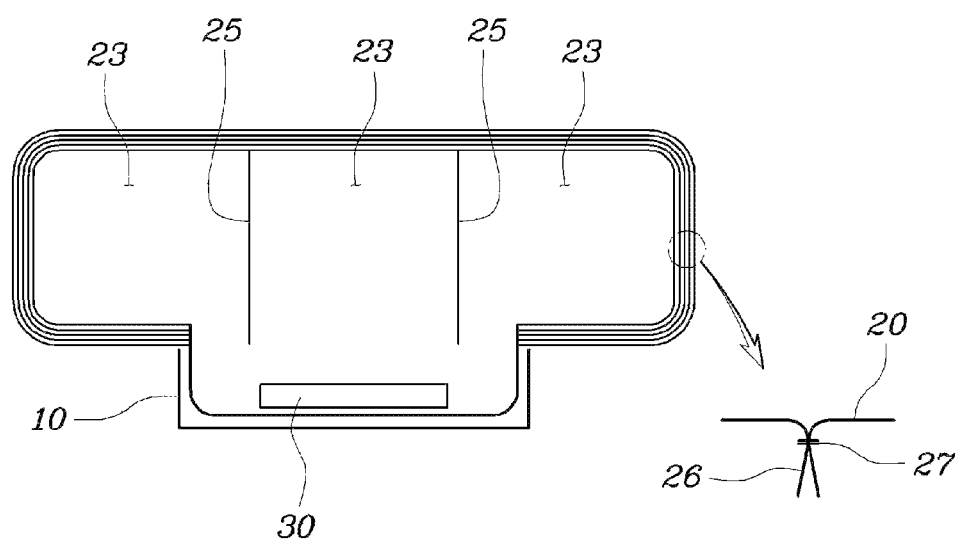
FIG. 7 is a view showing the construction of the conventional exterior airbag device.

FIG. 5 is a graph showing a dash deformation quantity for each portion in the event of a center pole collision of the vehicle equipped with the double shield exterior airbag device according to the exemplary embodiment of the present invention. The graph is obtained by measuring a deformation quantity using the sensor installed in the main part of the vehicle, when the head-on collision between the vehicle and the center pole occurs at a speed of 32 km/h. Referring to the graph, it can be seen that the deformation quantity of the present invention is lower than that of the prior art.

As described above, the present invention provides a double shield exterior airbag device, in which an airbag cushion filled with gas at the time of being deployed is formed in a single layer, thus reducing material costs in comparison with an airbag cushion having a multi-layered structure, and a manufacturing process is simplified, thus considerably reducing manufacturing costs.

Further, the present invention provides a double shield exterior airbag device, in which the outflow of gas occurs only in a partitioned chamber where there is a damaged portion, when any one of partitioned chambers constituting the airbag device is damaged due to a vehicle collision, and the remaining partitioned chambers reliably maintain a gas filled state, thus smoothly performing an airbag function, and remarkably enhancing the reliability of a product.

Furthermore, the present invention provides a double shield exterior airbag device, in which an overlapping portion of cushion materials connected to form interior and outer air cushions is sewn several times, thus preventing the outflow of gas due to the bursting of the overlapping portion in the event of a vehicle collision, therefore remarkably improving the reliability of a product in comparison with the conventional airbag device.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double shield exterior airbag device accommodated in an airbag housing mounted to a bumper of a vehicle, and deployed by gas supplied from an inflator, the double shield exterior airbag device comprising:
    an outer air cushion filled with the gas supplied from the inflator, and formed with a single cushion layer;
    an inner air cushion disposed in an internal space of the outer air cushion, and defining an inner chamber therein to receive the gas; and
    a plurality of partitioned chambers formed by a plurality of internal partitions that connect the outer air cushion with the inner air cushion, the partitioned chambers communicating with the inner chamber via a gas hole formed in the inner air cushion.

2. The double shield exterior airbag device as set forth in claim 1, wherein the inner chamber includes the inflator therein.

3. The double shield exterior airbag device as set forth in claim 1, wherein an entrance of the outer air cushion and an entrance of the inner air cushion are connected to the airbag housing mounted to the bumper of the vehicle in such a way as to be sealed.

4. The double shield exterior airbag device as set forth in claim 1, wherein the partitioned chambers are partitioned from each other between the inner air cushion and the outer air cushion by the internal partitions to have substantially the same internal volume.

5. The double shield exterior airbag device as set forth in claim 1, wherein the gas hole is provided with an anti-backflow guide hose, the anti-backflow guide hose extending from the gas hole by a predetermined length into the partitioned chambers so as to prevent the gas from flowing backwards from the partitioned chambers into the inner chamber.

6. The double shield exterior airbag device as set forth in claim 1, wherein an overlapping portion at which pieces of fabrics for forming the outer air cushion and the inner air cushion are connected to each other is sewn twice by a first sewing part which is sewn to connect portions from which overlapping of the fabrics is initiated, and by a second sewing part which is sewn to be connected to neighboring pieces of fabrics.

7. The double shield exterior airbag device as set forth in claim 1, wherein a size of the inner chamber is set such that the inner chamber is positioned in the internal space of the airbag housing when the airbag is deployed.

8. The double shield exterior airbag device as set forth in claim 7, wherein the inner chamber includes on opposite lateral sides thereof subsidiary partitioned chambers which are filled with the gas via the gas hole formed in the inner air cushion.

9. The double shield exterior airbag device as set forth in claim 1, wherein a size of the inner chamber is set such that the inner chamber expands and protrudes to an outside of the airbag housing, when the airbag is deployed.

10. The double shield exterior airbag device as set forth in claim 9, wherein the inner chamber includes on opposite lateral sides thereof subsidiary partitioned chambers which are filled with the gas via the gas hole formed in the inner air cushion.

11. The double shield exterior airbag device as set forth in claim 1, wherein a size of the inner air cushion forming the partitioned chambers is equal to or smaller than the size of the outer air cushion forming the partitioned chambers.

* * * * *